J. Burnham.
Truss.
No. 92,158.  Patented July 6. 1869
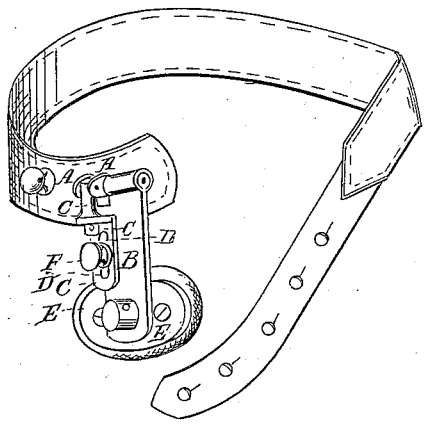
Witnesses:
H. F. Eberts
Jas. J. Ray
Inventor:
John Burnham
Per Attorney
Thos. S. Sprague

United States Patent Office.

JOHN BURNHAM, OF BATAVIA, ILLINOIS.

Letters Patent No. 92,158, dated July 6, 1869.

IMPROVEMENT IN TRUSSES.

The Schedule referred to in these Letters Patent and making part of the same

*To whom it may concern:*

Be it known that I, JOHN BURNHAM, of Batavia, in the county of Kane, and State of Illinois, have invented a new and useful Improvement in Trusses; and I do declare that the following is a true and accurate description thereof, reference being had to the accompanying drawings, and to the letters of reference marked thereon, and being a part of this specification.

Figure 1 is a perspective view of my invention.

The nature of this invention relates to an improvement in trusses; and consists in constructing them with a slotted plate moving upon the pad-lever, and attached by a hinge to shoulders fixed firmly to the spring of the truss, by which arrangement the pad can be adjusted to any desired pressure against the body of the wearer.

A A, in the drawing, represent shoulders fixed firmly to an extension of the truss-spring, to which shoulders the plate C is hinged by a pivot.

B represents the pad-lever hinged on a pivot produced by the further extension of the truss-spring beyond the shoulders A, and fastened by a screw to the pad E.

C is a movable plate hinged to the shoulders A A by a pivot, and moving freely upon the face of the pad-lever the length of the slot D.

F is a screw by which the plate C is fastened in position.

When the truss is applied, the pad E is pressed against the body, and by such pressure the plate C is raised on the pad-lever B. When the desired pressure is attained, the screw F is turned down, firmly fastening the plate C to the pad-lever B, thus holding the pad firmly in position. When it is desired to lighten the pressure, or to increase it, the effect may be produced by loosening the screw F, readjusting the pad, and fastening it in position by turning down the screw F, as before.

What I claim as my invention, and desire to secure by Letters Patent, is—

A truss-pad, the adjustment of which to the wearer is governed by a slotted plate attached to the truss-spring by a hinge-joint, and moving upon the pad-lever, and holding the same in the position desired, by pressure against it produced by a set-screw, substantially as and for the purpose set forth.

JOHN BURNHAM.

Witnesses:
  GEO. O. MANCHESTER,
  WM. M. VAN NORTWICK.